US006314455B1

(12) United States Patent
Cromer et al.

(10) Patent No.: US 6,314,455 B1
(45) Date of Patent: Nov. 6, 2001

(54) DATA PROCESSING SYSTEM AND METHOD FOR PERMITTING A SERVER TO REMOTELY INITIATE A CLIENT'S BOOT BLOCK RECOVERY

(75) Inventors: Daryl Carvis Cromer, Cary; Brandon Jon Ellison, Raleigh; Eric Richard Kern, Durham; Howard Locker, Cary; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,548

(22) Filed: Feb. 24, 1999

(51) Int. Cl.[7] .......... G06F 13/00
(52) U.S. Cl. .......... 709/217; 713/2
(58) Field of Search .......... 709/200, 203, 709/217, 218, 219, 224, 232, 222; 713/2

(56) References Cited

U.S. PATENT DOCUMENTS 5,842,011 * 11/1998 Basu .......... 713/2
5,870,554 * 2/1999 Grossman et al. .......... 713/2
5,960,175 * 9/1999 Grossman et al. .......... 709/222
5,974,546 * 10/1999 Anderson .......... 713/2
5,974,547 * 10/1999 Klimenko .......... 713/2
6,052,779 * 4/2000 Jackson et al. .......... 713/2
6,189,100 * 2/2001 Barr et al. .......... 713/182
6,212,651 * 4/2001 Schieve et al. .......... 714/36

* cited by examiner

*Primary Examiner*—Moustafa M. Meky
(74) *Attorney, Agent, or Firm*—John B. Schelkopf; Bracewell & Patterson L.L.P.

(57) ABSTRACT

A data processing system and method are described for permitting a server computer system to remotely initiate a boot block recovery from a failure of a client computer system to successfully complete execution of POST. The client computer system is coupled to a server computer system utilizing a network. The client computer system fails to successfully complete executing POST. Thereafter, the server computer system transmits a recovery POST code to the client computer system utilizing the network. The client computer system executes POST utilizing the recovery POST code, wherein the client computer system is capable of successfully completing execution of POST utilizing the recovery POST code received remotely from the server computer system.

12 Claims, 5 Drawing Sheets

ASIC
300
Reset
360
Registers Status
Boot Recovery Bit
304
322
Micro Controller
302
EEPROM Interface
314
EEPROM
320
SM Bus Interface
316
RX Buffer
318
TX FIFO
306
FIFO Control
308
RX FIFO
310
MII Interface
10/100Mbps
CSMA Logic
312
MII Bus
252
SM Bus
238

DATA PROCESSING SYSTEM AND METHOD FOR PERMITTING A SERVER TO REMOTELY INITIATE A CLIENT'S BOOT BLOCK RECOVERY

BACKGROUND OF THE INVENTION

1. Field of the Invention:

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to remotely initiate a boot block recovery from a failure of the client to boot.

2. Description of the Related Art:

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

One known method for permitting a server computer system to perform maintenance remotely over the network is called LAN Client Control Manager (LCCM) available from International Business Machines. This method permits the network manager to perform various operations on the client remotely, including limited maintenance. However, some maintenance functions may not be performed remotely. For example, a service call is required for a technician to physically be present at a client computer system in order to recover from a defective flash image error.

A computer system requires a basic input/output system (BIOS) in order to operate. The BIOS is code that controls basic hardware operations, such as interactions with disk drives, hard drives, and the keyboard.

When a computer is reset or initially powered-on, a boot process begins. First, POST begins executing. POST is an initialization code which configures the system utilizing initialization settings stored in storage, such as CMOS storage. Once POST has configured the system, BIOS then controls the basic operation of the hardware utilizing the hardware as it was configured by POST. The boot process is complete once an operating system has been handed control of the system. In order for the boot process to be complete, POST must complete its execution.

POST and BIOS are both typically stored as a single flash image in a storage device such as a flash memory. This image is commonly called the "boot code". If the flash image of POST and BIOS is corrupted, the boot of the system will not be able to be completed.

To recover from a defective flash image error, known systems include a boot block. The boot block is storage within the flash memory which includes a small segment of code sufficient to bring the system up, and to read a recovery image from a floppy drive. A diskette must be inserted into the floppy drive which includes a good copy of the flash image. The code stored in the boot block is not typically updated.

In order for the system to boot from the boot block, a technician must remove the cover of the computer system, and physically move a jumper coupled to the flash memory. The jumper is utilized to indicate whether a boot will be attempted from the boot block or the main flash memory. The technician then must replace the cover, insert an appropriate diskette in the floppy drive, and restart the computer. The computer will then attempt to boot from the boot block.

Therefore a need exists for a data processing system and method for permitting a server computer system to remotely initiate a boot block recovery from a failure of a client computer system to boot.

SUMMARY OF THE INVENTION

A data processing system and method are described for permitting a server computer system to remotely initiate a boot block recovery from a failure of a client computer system to successfully complete execution of POST. The client computer system is coupled to a server computer system utilizing a network. The client computer system fails to successfully complete executing POST. Thereafter, the server computer system transmits a recovery POST code to the client computer system utilizing the network. The client computer system executes POST utilizing the recovery POST code, wherein the client computer system is capable of successfully completing execution of POST utilizing the recovery POST code received remotely from the server computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for permitting a server computer system to remotely initiate a boot block recovery from a client computer system's failure to boot. The client always initiates the start of POST utilizing the code stored in the boot block. When the client is not configured to update the POST code from the network and cannot update the POST code when there is no POST code image floppy in the floppy drive, the client will then attempt to execute POST utilizing the complete POST code stored in the flash memory.

The server computer system is either notified or detects a failure to complete POST due to a corrupted POST code stored in the flash in the client computer system. The server, then, transmits a message to the client computer system setting an image recovery bit within the client. The server then transmits a message resetting the client.

POST begins executing within the client and checks the image recovery bit to determine if it is set. If the bit is set, the client logs onto a server over the network. The server transmits a recovery POST code, also called a recovery flash image, to the client. The client stores the recovery POST code. Start of POST in the boot block copies the recovery POST code to the flash. POST, then, executes on the client computer system utilizing the image stored in the flash, which is now the recovery POST code image.

Figure 1:
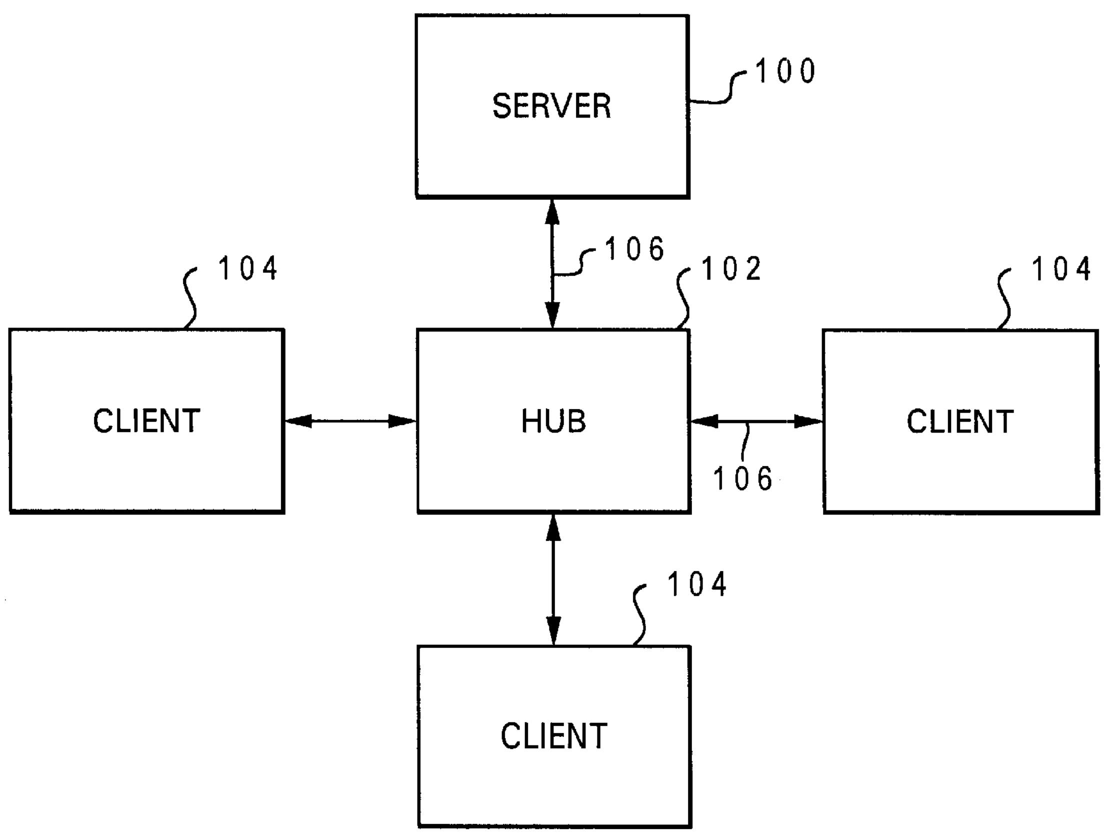
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 2:
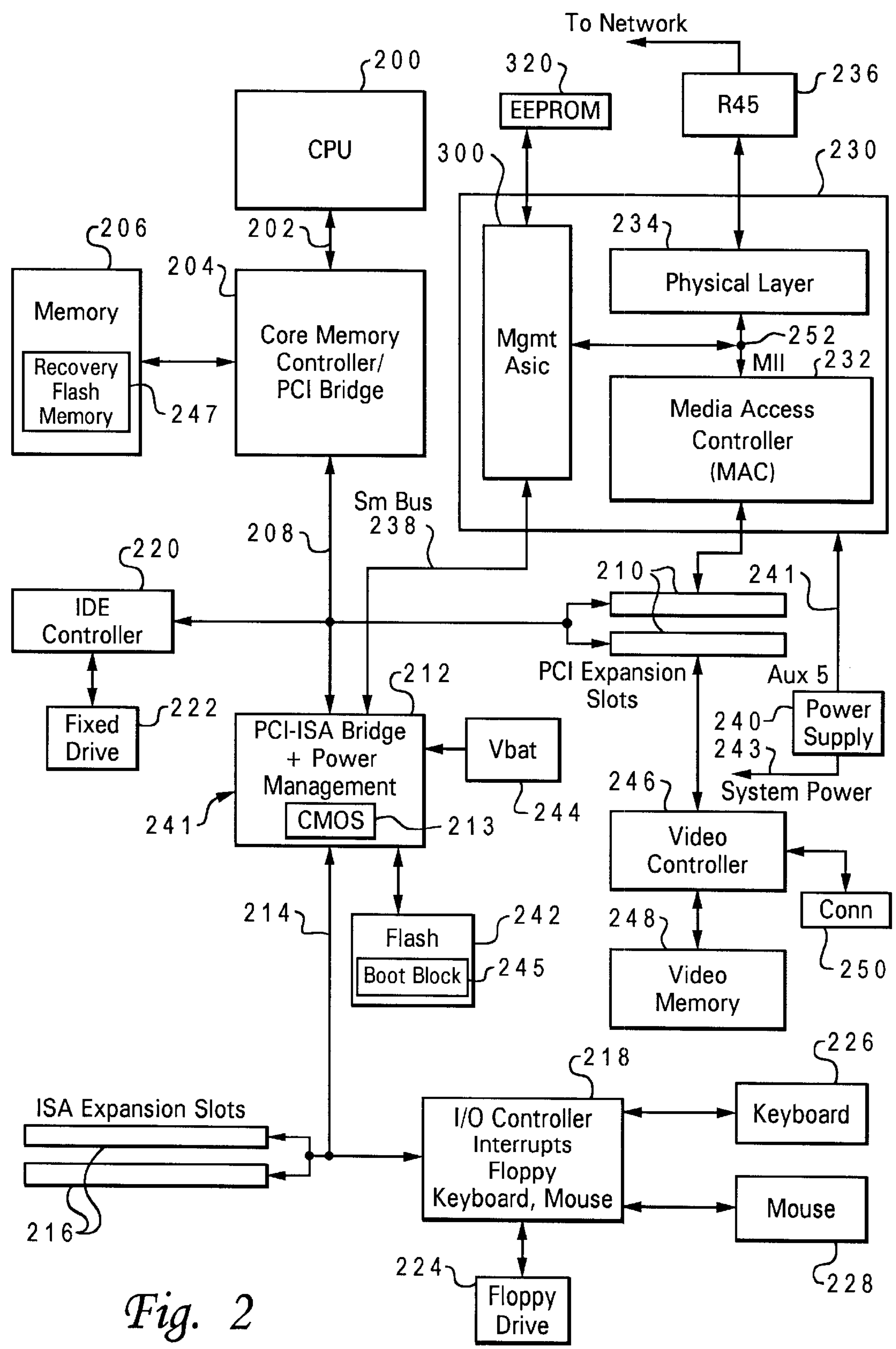
FIG. 2 depicts a pictorial representation of a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206.

System memory 206 includes a recovery flash memory 247 which is utilized for temporarily storing recovery flash code received from server 100. The recovery flash code is a replacement flash image designed to update the flash image stored in flash 242 without any manual intervention.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. Flash memory 242 includes a boot block 245. Boot block 245 is storage which includes a small segment of code sufficient to bring up client computer system 104, and to initiate a copying of a new flash image from a floppy drive.

PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 241 which supplies full time auxiliary power 241 to the power management logic 212 and to the network adapter 230. This enables client 104 to respond to a wakeup signal from network adapter 230. In response to a receipt of the wakeup signal, normal system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. With the trickle power supplied by signal AUX 5 241 from power supply 240, ASIC 300 is preferably powered full time.

Figure 3:
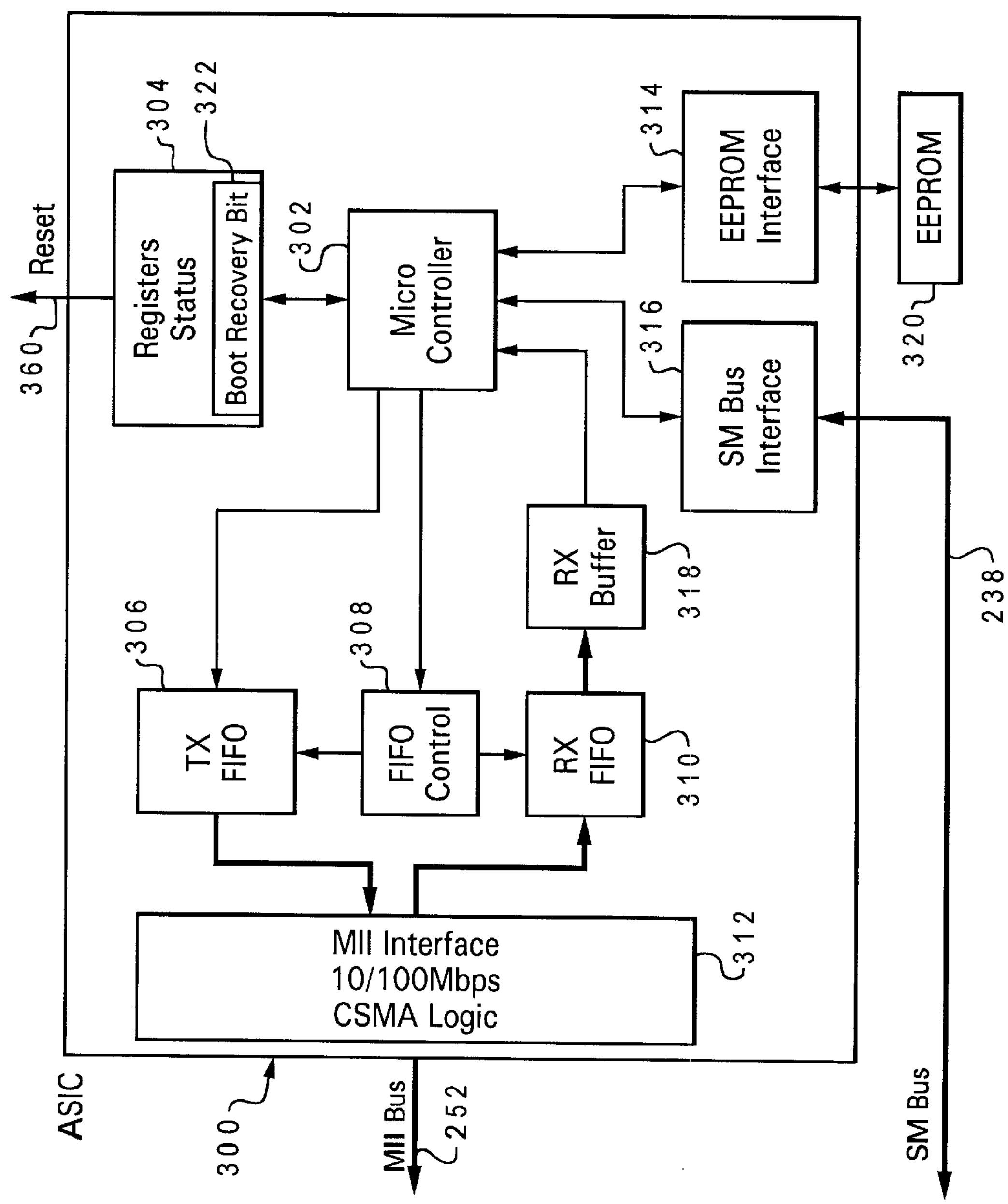
FIG. 3 illustrates a pictorial representation of a special purpose processing unit included within a network adapter included within a client computer system in accordance with the method and system of the present invention.

FIG. 3 illustrates a pictorial representation of a special purpose processing unit included within network adapter 230 included within a client computer system 104 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests through SM bus interface 316 from software running on client 104 to access register status 304. Register/status 304 is capable of outputting a reset signal 360 which causes client 104 to reset itself. Signals are received from the MII bus 252 by interface unit 312 and passed to RX FIFO 310. ASIC 300 includes an EEPROM interface 314 for accessing a storage device such as EEPROM 320.

Register status 304 includes an image recovery bit 322 which is utilized by POST to determine if client 104 is to update POST utilizing recovery flash code stored in recovery flash memory 247. When bit 322 is set, the recovery flash image stored in memory 247 is copied to flash 242 and utilized to execute POST on client 104. When bit 322 is not set, the recovery flash image stored in memory 247 is not utilized to execute POST on the client.

Figure 4:
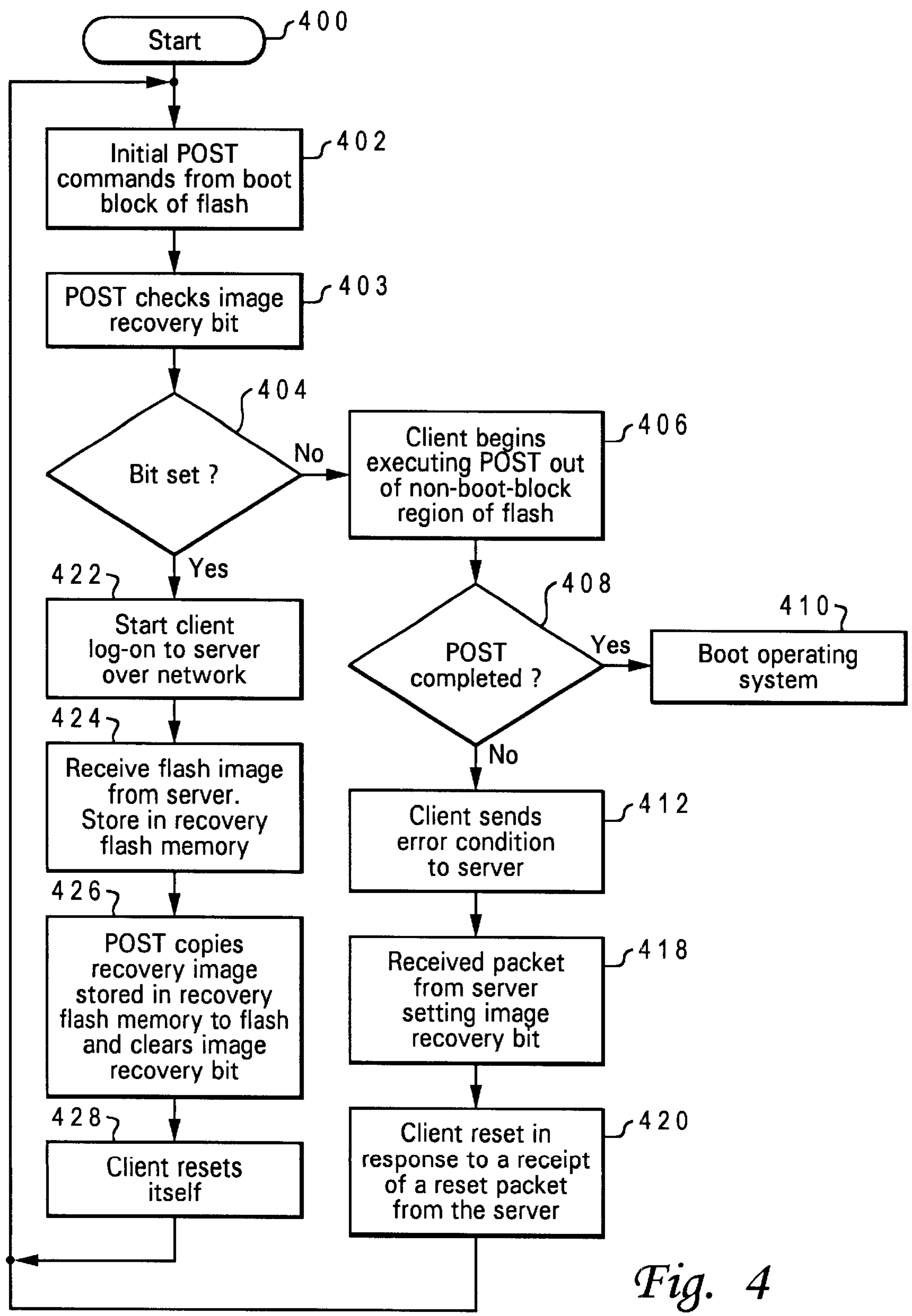
FIG. 4 illustrates a high level flow chart which depicts a client computer system utilizing a recovery flash image received from a server computer system via a network in accordance with the method and system of the present invention.

FIG. 4 illustrates a high level flow chart which depicts a client computer system utilizing a recovery flash image received from a server computer system via a network in accordance with the method and system of the present invention. The process starts as depicted at block 400 and thereafter passes to block 402 which illustrates a client executing initial POST commands from boot block 245 of flash 242. Block 403, then, depicts POST checking image recover bit 322 to determine whether or not it is set. The boot process is initiated utilizing the boot block 245 which attempts to boot either from a floppy drive or the network. In a typical configuration, the client disallows booting from the network and does not have a bootable floppy diskette inserted into the floppy drive. The process then passes to block 404 which depicts a determination of whether or not image recovery bit 322 is set. If a determination is made that image recovery bit 322 is not set, the process passes to block 406 which illustrates a client computer system beginning execution of POST utilizing a non-bootblock region of flash 242. Therefore, the boot will continue utilizing the image stored in flash 242.

The process then passes to block 408 which depicts a determination of whether or not POST completed execution. If a determination is made that the client successfully completed executing POST, the process passes to block 410 which illustrates the client continuing to boot an operating system.

Referring again to block 408, if a determination is made that execution of POST was not successfully completed, the process passes to block 412 which illustrates the client transmitting an error condition to the server indicating that execution of POST did not successfully complete. Alternatively, if the client is unable to transmit such an error message, the server will detect a hang condition.

Next, block 418 depicts the client receiving an information packet from the server which sets image recovery bit 322. Thereafter, block 420 depicts the client being reset in response to a receipt of a reset packet from the server.

Referring again to block 404, if a determination is made that image recovery bit 322 is set, the process passes to block 422 which depicts the client starting a log-on process to the server over the network. Next, block 424 illustrates the client receiving a recovery flash image 247 from the server, and the storage of image 247 in memory 206. Block 426, then, depicts POST copying recovery flash image 247 to flash 242. Thereafter, block 428 illustrates the client resetting itself utilizing reset signal 360 utilizing the flash image stored in flash 242. The recovery flash image 247 is now stored in flash 242. Therefore, POST uses the corrected flash image 242 to boot.

Figure 5:
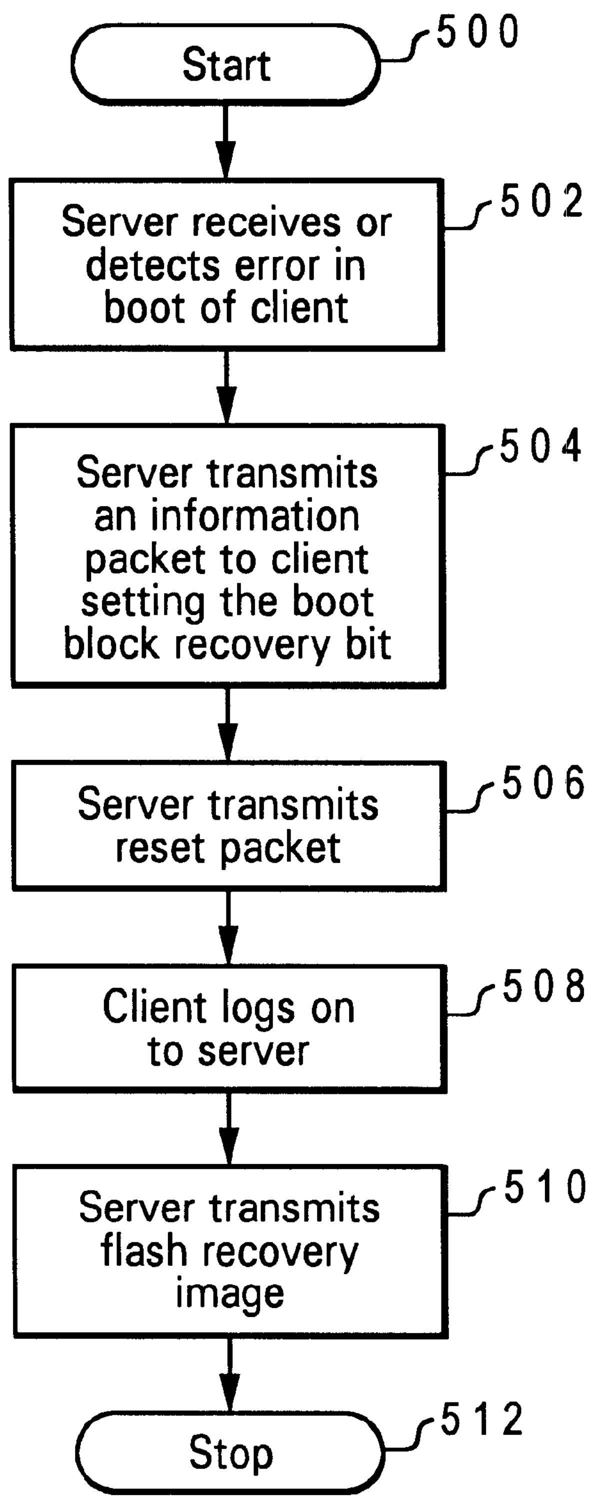
FIG. 5 depicts a high level flow chart which illustrates a server computer system transmitting a recovery flash image to a client computer system in accordance with the method and system of the present invention.

FIG. 5 depicts a high level flow chart which illustrates a server computer system transmitting a recovery flash image to a client computer system in accordance with the method and system of the present invention. The process starts as illustrated at block 500 and thereafter passes to block 502 which depicts the server computer system receiving or detecting a failure of the client computer system to boot. Next, block 504 illustrates the server computer system transmitting an information packet to the client which sets recovery boot block bit 322. Thereafter, block 506 depicts the server transmitting a packet to reset the client. Block 508, then, illustrates the client logging on to the server over the network. Next, block 510 depicts the server transmitting a flash recovery image to the client. The process then terminates as illustrated at block 512.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer to remotely initiate a boot block recovery from a failure of a client computer system to successfully complete execution of POST, said client computer system being coupled to a server computer system utilizing a network, said method comprising the steps of:

said client computer system failing to successfully complete execution of POST;

said server computer system transmitting a recovery POST code to said client computer system utilizing said network; and said client computer system executing POST utilizing said recovery POST code, wherein said client computer system is capable of successfully completing execution of POST utilizing said recovery POST code received remotely from said server computer system.

2. The method according to claim 1, further comprising the step of said client computer system successfully completing execution of POST utilizing a boot block included within a flash memory device prior to attempting to execute POST utilizing a POST code stored in said flash memory.

3. The method according to claim 2, further comprising the step of said client computer system failing to successfully execute POST due to said POST code being corrupted.

4. The method according to claim 3, further comprising the step of establishing an image recovery bit within said client computer system, said client computer system utilizing said recovery POST code when said image recovery bit is set.

5. The method according to claim 4, further comprising the step of establishing a recovery flash storage within said client computer system for storing said recovery POST code.

6. The method according to claim 5, further comprising the steps of:

said server computer system detecting said failure of said client computer system to successfully complete execution of POST; and said server computer system transmitting a message to said client computer system setting said image recovery bit in response to a detection of said failure to successfully complete execution of POST.

7. A data processing system for permitting a server computer to remotely initiate a boot block recovery from a failure of a client computer system to successfully complete execution of POST, said client computer system being coupled to a server computer system utilizing a network, comprising:

said server computer system executing code for transmitting a recovery POST code to said client computer system utilizing said network in response to said client computer system failing to successfully complete execution of POST; and said client computer system capable of executing POST utilizing said recovery POST, wherein said client computer system is capable of successfully completing execution of POST utilizing said recovery POST code received remotely from said server computer system.

8. The system according to claim 7, further comprising said client computer system capable of executing POST utilizing a boot block included within a flash memory device prior to attempting to complete execution of POST utilizing a POST code stored in said flash memory.

9. The system according to claim 8, farther comprising a image recovery bit within said client computer system, said client computer system capable of utilizing said recovery POST code when said image recovery bit is set.

10. The system according to claim 9, further comprising a recovery flash storage within said client computer system for storing said recovery POST code.

11. The system according to claim 10, further comprising:

said server computer system capable of detecting said failure of said client computer system to successfully complete execution of POST; and said server computer system executing code for transmitting a message to said client computer system setting said image recovery bit in response to a detection of said failure to successfully complete execution of POST.

12. A data processing system for permitting a server computer to remotely initiate a boot block recovery from a failure of a client computer system to successfully complete execution of POST, said client computer system being coupled to a server computer system utilizing a network, comprising:

said client computer system capable of executing POST utilizing a boot block included within a flash memory device prior to attempting to execute POST utilizing a POST code stored in said flash memory device;

said server computer system capable of detecting a failure of said client computer system to successfully complete execution of POST;

said server computer system executing code for transmitting a message to said client computer system setting an image recovery bit within said client computer system and transmitting a recovery POST code to said client computer system in response to a detection of said failure to successfully complete execution of POST;

said client computer system capable of executing POST utilizing said recovery POST code in response to a failure of said client computer system to successfully complete execution of POST;

said client computer system capable of utilizing said recovery POST code when said image recovery bit is set; and a recovery flash storage within said client computer system for storing said recovery POST code.

* * * * *